United States Patent [19]

Busboom et al.

[11] Patent Number: 5,255,358
[45] Date of Patent: Oct. 19, 1993

[54] ACTION BAR PROCESSING ON NON-PROGRAMMABLE WORKSTATIONS

[75] Inventors: Leah J. H. Busboom, Oronoco; Stephen T. Eagen; Harvey G. Kiel, both of Rochester, all of Minn.

[73] Assignee: International Business Machines, Armonk, N.Y.

[21] Appl. No.: 655,874

[22] Filed: Feb. 14, 1991

[51] Int. Cl.$^5$ .............................................. G06F 15/62
[52] U.S. Cl. ..................................... 395/153; 395/156
[58] Field of Search ............... 395/153, 156, 162, 163; 340/721

[56] References Cited

U.S. PATENT DOCUMENTS 4,786,894 11/1988 Furusawa et al. ................... 340/709
4,924,410 5/1990 Hamada ............................... 395/153
5,038,301 8/1991 Thoma, III .......................... 395/153
5,046,027 9/1991 Taaffe et al. ........................ 395/153

FOREIGN PATENT DOCUMENTS

169287 9/1985 Japan ................................... 395/153

Primary Examiner—Mark K. Zimmerman
Attorney, Agent, or Firm—Palmatier, Sjoquist & Helget

[57] ABSTRACT

In a computing system including a host processor, a workstation controller, and a number of nonprogrammable workstations connected to the workstation controller, a method and apparatus to enable the workstation controller to construct and present action bars and pull-down menus for display at any designated workstation, and to process user interactions generated by keyboard signals at the workstation to control the selection and presentation of action bars and pull-down menus.

5 Claims, 11 Drawing Sheets

```
     View    Print   Delete   Exit   Help
```

Patient Services Update

Type patient name or request prompt.
Select one from each group. Then Enter.

Patient Name . . . ___________________________

Status              Type of Order        Period

1. Outstanding      1. Care and Treatment   1. Since admission
   2. Completed        2. Pharmacy             2. Past 7 days
   3. Canceled         3. Heart Station        3. Past 72 hours
   4. Deleted          4. Physical Therapy     4. Past 24 hours
                       5. Other

FIG. 6

```
  View    Print    Delete    Exit    Help
                              ┌─ ─ ─ ─ ─ ─ ─ ┐
                              │ 1. Save and exit              │
                 Patient Servi│ 2. Exit without saving        │
                              │ 3. Resume                     │
                              └─ ─ ─ ─ ─ ─ ─ ┘

Type patient name or request prompt.
Select one from each group.  Then Enter.

Patient Name . . . ─────────────────────────

Status              Type of Order         Period

1. Outstanding      1. Care and Treatment  1. Since admission
    2. Completed        2. Pharmacy            2. Past 7 days
    3. Canceled         3. Heart Station       3. Past 72 hours
    4. Deleted          4. Physical Therapy    4. Past 24 hours
                        5. Other
```

ACTION BAR PROCESSING ON NON-PROGRAMMABLE WORKSTATIONS

BACKGROUND OF THE INVENTION

The present invention relates generally to computer workstations which are connected for information interchange with host or mainframe computer systems; more particularly, the invention relates to a method and apparatus for processing action bars and pull-downs on certain non-programmable workstations by sharing the processing operations amongst a workstation controller, a host processor and a non-programmable workstation. The invention enhances the user interface associated with non-programmable workstations, to be more closely representative of the user interface associated with programmable workstations.

In any typical prior art system utilizing a host processor, workstation controller, and workstations, wherein the workstations are utilized for user interaction and access and the host processor is utilized for running applications programs, the host processor provides certain fundamental information. For example, the host processor may generate a data stream containing information to be displayed on a workstation screen, and information for controlling the presentation and position of the data on the screen. In the case of a programmable workstation (PWS), the host processor data stream is sent directly to the workstation and is processed internally in the workstation, which itself contains sufficient internal memory and program data to directly control the interaction with the display screen and keyboard. In the case of a non-programmable workstation (NWS), the host processor data stream is sent to a workstation controller (WSC), and the WSC provides the internal memory and control for directly controlling the display screen of the NWS. In either case, the host processor-constructed data stream is received by a workstation control interface (hardware and/or software), and the workstation control interface processes the data stream. A workstation controller communicates with attached NWS workstations to determine whether a keystroke should be recognized or whether any of a predetermined number of commands from the workstation controller have been processed.

Although a PWS terminal is of considerably more sophisticated design than an NWS terminal, when it is used in an environment where a host processor executes applications programs and merely utilizes the PWS terminal for NWS-like operator/user interface, the PWS terminal suffers from most of the same limitations as an NWS terminal. For example, each time a display panel is to be changed on the screen of either type of terminal as a result of user interaction, the host processor creates the panel description, and presentation, and constructs a data stream for transmission to the workstation controller.

The inherent superiority of the logical design sophistication of a PWS enables the designer to incorporate certain user interface enhancements into a stand-alone PWS application, which enhancements have heretofore been severely degraded in systems utilizing NWS terminals. One such enhancement, the "action bar," is a widely used PWS enhancement, whereas this enhancement has been degraded in systems having NWS terminals because the internal logical design capability of an NWS terminal is simply too limited to permit the processing operations required. These limitations have forced users of NWS terminals to operate under a different and more limited set of interface rules than users of PWS-based applications. However, since a total system environment may include a host processor connected to a significant plurality of mixed terminals, a system user must be familiar with both sets of operating rules in order to effectively interface with the application program being run, through either a PWS terminal or an NWS terminal.

The necessity that a system user be knowledgeable of different sets of user interface rules seriously compromises the operational effectiveness of the total system. The dilemma arises from the historically competing demands of increased sophistication and uniformity of operation versus the competitive demands of system costs. The marketplace has created a demand for low-cost keyboard/display terminals, which has resulted in the widespread use of NWS terminal devices; system users have created a demand for increasingly sophisticated and "user-friendly" interactions with applications, which has led to the design of the PWS terminal devices. Computer manufacturers, in an effort to satisfy these competing demands, have devised uniform system architecture rules to enable the interconnection and shared usage of both NWS and PWS terminals in the same system. To the greatest extent practicable the user interface rules for these mixed systems have been uniformly devised. For example, International Business Machines (IBM) has defined a "systems application architecture" to layout a common set of rules for system design and interconnection of subsystems. The user interface to the system application architecture is also defined, and reference should be made to an IBM Publication No. SC26-4351-0, entitled "Common User Access-Panel Design and User Interaction." These common user access (CUA) rules define and describe the techniques and conventions to enable application designers and developers to create various application software that will operate effectively on a wide variety of different IBM computer systems. CUA is one part of the IBM systems application architecture (SAA), which is a complete set of selected software interfaces, conventions, and protocols that serves as a common framework for application development, portability, and use on multiple system types. Among the IBM systems to which these rules apply are the System/370, IBM Personal Computers, and AS/400 System. The CUA rules are uniformly devised except, as here, where hardware limitations prevent such uniformity.

The present invention overcomes apparent hardware limitations in NWS devices to enable, for the first time, the processing of PWS-like "action bars" in display screen constructs for such devices which appears to be identical to PWS devices. An "action bar" is a list of available action choices from which users select one choice, which results in the screen presentation of an associated pull-down menu, in which the user is requested to select options or parameters associated with that action. Reference should be made to the aforementioned IBM publication for a description definition and presentation of action bars and pull-down menus, and for the user interaction with action bars.

SUMMARY OF THE INVENTION

The present invention provides a method and apparatus for constructing and presenting action bars and pull-down menus in display panel constructs associated with NWS terminals, particularly in systems having a host processor interconnected via workstation controllers to a plurality of NWS terminals. In particular, the invention enables the user of an NWS terminal to select an action via a mnemonic character, a cursor up or down key, and an Enter key on the keyboard. The resulting pull-down menu will be presented instantly because the action choice selection is processed within the WSC rather than within the host processor. This enables NWS terminals to perform real-time selection feedback and to process action bar selections in the same apparent manner as stand-alone PWS applications. The invention utilizes an extended data stream transmitted from a host applications program to set aside localized data storage areas in the interconnected WSC, associated with each particular NWS, to define the parameters of action bar choices. In addition, the invention utilizes processing techniques in the WSC to interact with the NWS keyboard and display screen, to thereby distribute the processing activities amongst the host processor, the WSC, and the NWS, to provide the same degree of user interaction with respect to action bar processing as was previously found only in stand-alone PWS applications.

It is a feature of the present invention to enable the display data manager software within a host processor to be written so as to provide a data stream which incorporates action bar processing definitions, and to store information from this data stream in a WSC, and to perform the necessary processing functions within the WSC to provide the action bar processing characteristics to any of a plurality of NWS terminals.

It is the principal object of the present invention to provide user interface functions with respect to action bars in a WSC/NWS interconnection, as were previously provided in a PWS.

BRIEF DESCRIPTION OF THE DRAWINGS

The foregoing and other objects and advantages of the invention will become apparent from the following specification, and with reference to the claims and the appended drawings, in which:

DESCRIPTION OF THE PREFERRED EMBODIMENT

Programmable Workstation

Figure 1:
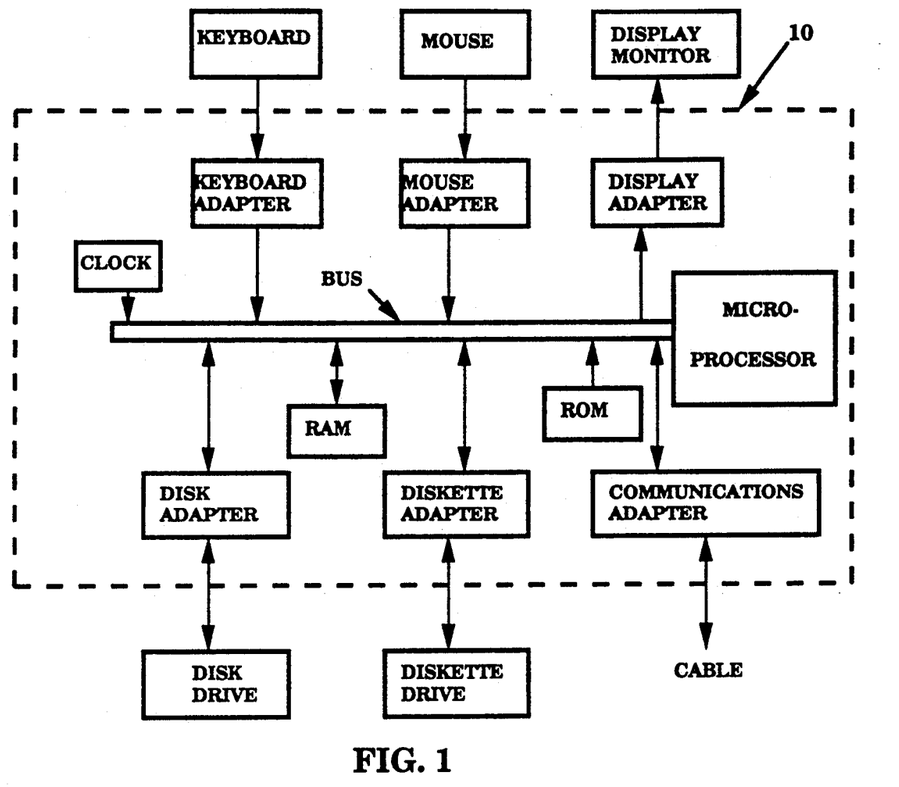
FIG. 1 shows a typical block diagram of a PWS.

Referring first to FIG. 1, there is shown a typical block diagram of a programmable workstation (PWS); the circuits within the dotted outline 10 are generally found on one or more circuit boards within the PWS framework. The microprocessor is typically an Intel type 80286 or 80386, or equivalent microprocessors by other manufacturers. The microprocessor has an external bus which may communicate with a number of adapters which themselves are connectable to various internal and external devices.

The host processor communicates with the PWS via a communications line, identified as a "cable" in FIG. 1. A plurality of PWS devices may be connected to a host processor via such communications lines, wherein each PWS has an internal application program known as "Workstation Function," which enables the PWS to perform the same tasks as the combination of an NWS and workstation controller as hereinafter described. The host processor is not concerned with, nor does it require specific knowledge of, which of the several types of remote workstations it is communicating with. When the host processor determines that a display screen representation is to be transmitted to a remote workstation, it constructs a data stream having the content described above, which is known in the prior art as a "5250 data stream." The format of this data stream is identical for communications with a PWS and a WSC, for the Workstation Function software operating within the PWS enables the PWS to process the data stream in the same manner as a WSC would process the data stream. While the processing actions within a PWS differ from the processing actions within a WSC, the external interaction with a host processor is identical in both cases. Likewise, when the operator at a remote workstation makes a keystroke, the processing actions which pass to the host processor are identical in either case, and the user is limited to NWS-like user interface, although the internal processing within a PWS is different from the internal processing within a WSC.

The typical PWS will have a keyboard, and optionally a mouse, connected through adapters to the internal bus, a display monitor connected through an adapter to the internal bus, one or more disk or diskette adapters coupled to one or more disk or diskette drives and connected to the internal bus, and a communications adapter which is connectable to other systems via external cables. The RAM is typically a random access memory having 1-16 megabyte capacity, which is sufficiently large to store a complete operating system, an extensive work area for programmable calculations, a monitor screen buffer area and an area for executing application programs. The ROM is a read only memory which typically contains coding for initializing the machine, for performing diagnostic operations, and for controlling the basic I/O system; the ROM is typically 64-128 kilobytes in capacity. The PWS is therefore operable as a stand-alone computer system, or as an independent workstation which may be connected to a host computer via external cables. The capabilities of the PWS enable it to provide a wide variety of user interface enhancements, including a full range of cursor controls, instantaneous scrolling, and display panel modification. All of these enhancements are contained and controlled within the PWS itself, although when a PWS is connected to a host computer processor and is operated as a workstation, it receives its overall command and control from the applications software in the host processor. In the preferred embodiment, the PWS shown in FIG. 1 is an IBM Personal System/2 or equivalent, although another IBM personal computer, or equivalent design, could be used.

Non-Programmable workstation (NWs)

Figure 2:
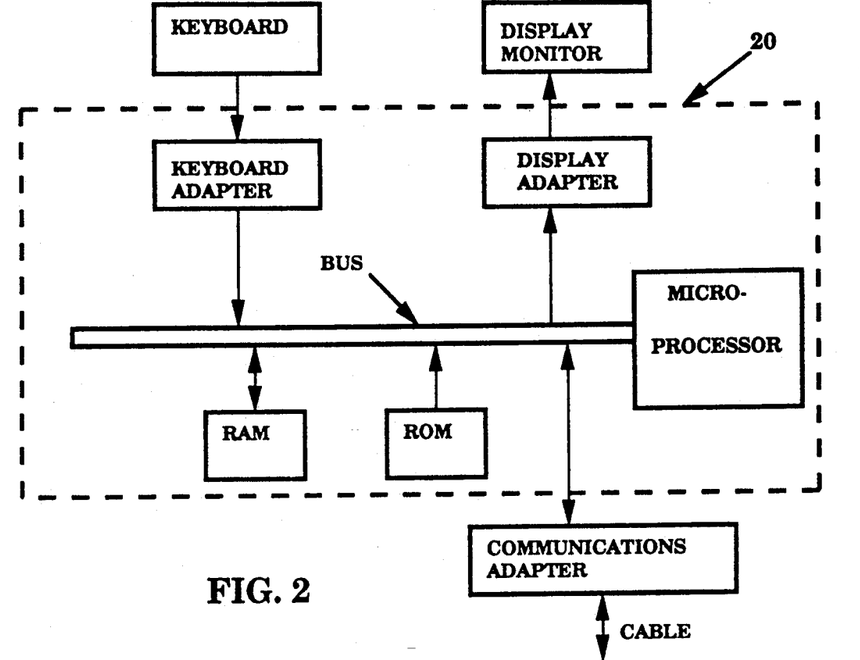
FIG. 2 shows a typical block diagram of an NWS.

FIG. 2 shows a typical block diagram of an NWS, wherein the circuits typically found within the framework are designated within dotted outline 20. This type of workstation is also sometimes referred to as a "dependent workstation." The microprocessor is typically an Intel type 8088 or 8086 circuit device, or equivalent, and the microprocessor has an external bus which is connectable to several adapters for enabling communications with a limited number of external devices. For example, a keyboard adapter enables communications between the microprocessor and a keyboard, a display adapter enables information to be transferred to a display monitor, and a "communications" adapter enables communications to be made between the NWS and a workstation controller. The RAM is typically capable of 3-5 kilobytes of storage, for storing a screen buffer, and for providing a limited amount of memory work area for internal processing. The ROM is typically about 8 kilobytes in capacity, for storing coding relating to power-on processing, diagnostics, and character generation patterns and process communication protocols for communicating with a workstation controller. The NWS is incapable of any significant internal processing beyond that which is required to interface with the keyboard and display monitor, and to communicate via the communications adapter. Therefore, all of the information (except for diagnostics and set-up information from ROM) displayed on the display monitor must be provided via the communications adapter to the RAM, and the microprocessor will generate sufficient internal control to display the information on the display monitor. Similarly, all keystrokes from the keyboard are temporarily received in the RAM, subject to activation of the communications adapter for transmission of the keystroke information over the cable to the WSC. In the preferred embodiment, the NWS shown in FIG. 2 is an IBM 5250 family display, although other equivalent types of NWS could be used.

Workstation Controller (WSC)

In typical systems, the function of a "Workstation controller" is to provide information transfer and control to a plurality of remote NWS terminals from a single host processor. This workstation controller function is usually performed by a hardware and software package which is uniquely identified and separate from the host processor hardware and software packages. The hardware for a workstation controller is typically contained on a circuit board package which is pluggable into a host processor card slot, and the software for a workstation controller is typically executed by the hardware independently of software which is executed by the host processor. However, in certain systems, the workstation control interface function of a "workstation controller" is entirely a software package function, the software being executed within the host processor hardware. The preferred embodiment of the present invention is disclosed with respect to the workstation controller concept which is physically separate from the host processor in both hardware and software details.

If a workstation controller is physically remotely positioned from the host processor, its communications with the host processor are made via a communication line, connected in a manner similar to the connection of various other remotely located devices. If the workstation controller is physically incorporated into the host processor mainframe as a pluggable card, the workstation controller may communicate with the host processor utilizing the normal channel connections associated with the host processor.

Figure 3:
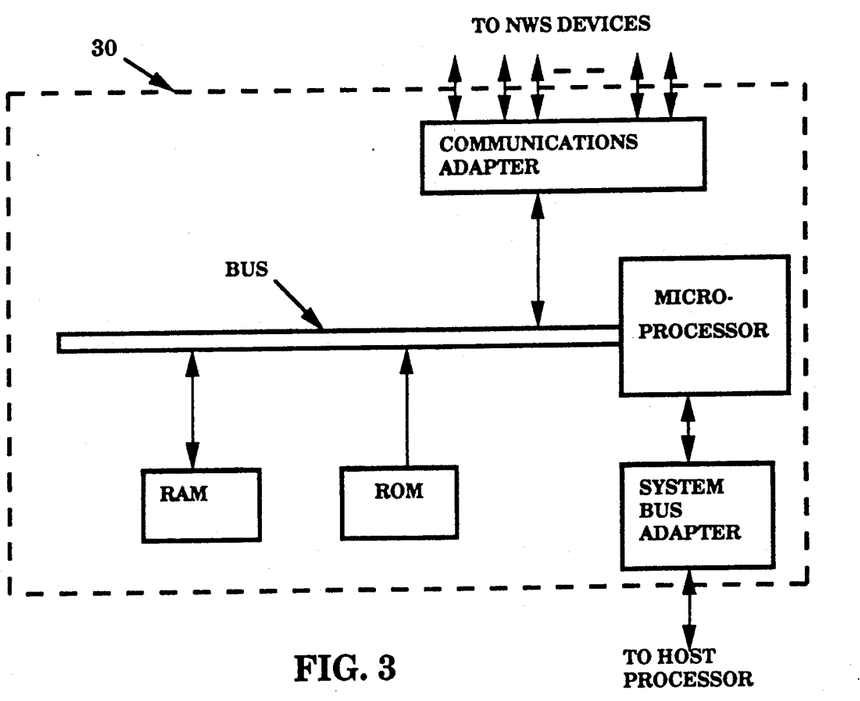
FIG. 3 shows a typical block diagram of a workstation controller.

FIG. 3 shows a typical block diagram of a workstation controller, of the type which typically communicates with a plurality of NWS devices. The workstation controller has a number of circuits contained within a package designated by dotted outline 30, and a microprocessor which is typically an Intel type 80826 circuit chip, or equivalent. The WSC microprocessor is typically connected to a system bus adapter which itself may communicate with a host computer processor. The WSC also has an internal data bus and a RAM having a capacity of 0.5-2.0 megabytes, and a ROM having a capacity of about 16 kilobytes, containing coding for initializing the WSC and for diagnostics relating to the WSC. The internal data bus of the WSC is connected to a communications adapter, which is externally connected to a "fan-out" multiplexer for enabling a plurality of NWS devices to communicate with a single WSC. In a typical application, the fan-out circuits are connectable to up to 40 NWS terminals. Keystroke signals from all of the NWS terminals are received by the WSC and stored within the RAM, for subsequent communication to the host processor or for internal processing by the WSC. In the preferred embodiment the WSC of FIG. 3 is a "feature card" for an AS/400 computer system, wherein the microprocessor is suitably programmed.

Figure 4:
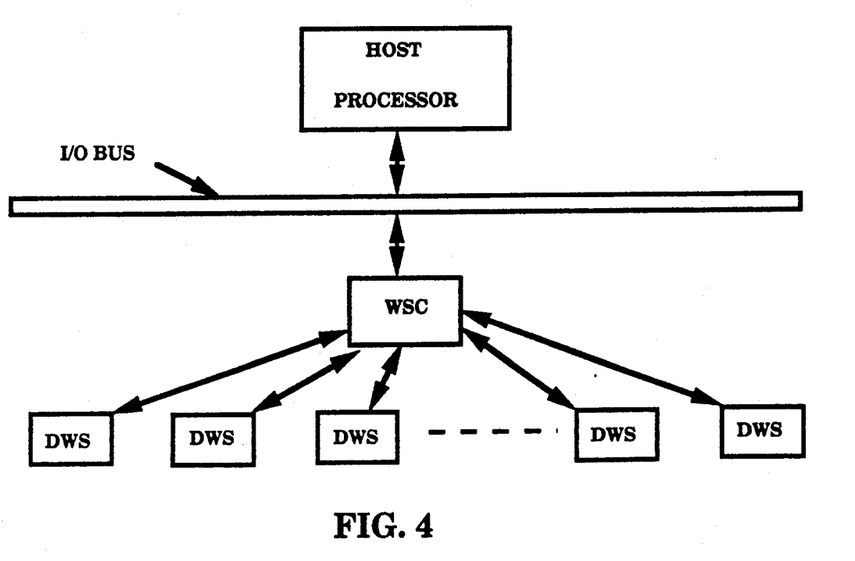
FIG. 4 shows a typical block diagram of a plurality of NWS devices connected to a host processor via a WSC.

FIG. 4 shows a typical block diagram of the system interconnections, wherein the host processor communicates with a WSC via an I/O bus, and a WSC communicates with up to 40 NWS devices via communications cables. Other devices and controllers may be connected to the I/O bus for communication with the host processor. In the preferred embodiment, the host processor is part of an AS/400 computer system.

Under typical operating conditions in the prior art, the host processor will construct a data stream for each of the terminals to which it is connected, the host processor will then transfer a data stream representative of each screen display panel, and various screen display field definitions to the WSC, where the field definitions are retained and the display panel data is temporarily retained within a section of RAM identifiable with each particular NWS. The WSC then transfers the display panel data to a specific NWS device. Each NWS device contains sufficient internal storage to retain the display panel data for purposes of presenting the display panel to the user. If an NWS user makes a keystroke, the NWS signals the WSC that the NWS has keystroke data available. The WSC receives the transfer of this keystroke data when polling the NWS, and subsequently transfers the keystroke information to the host processor.

Figure 5:
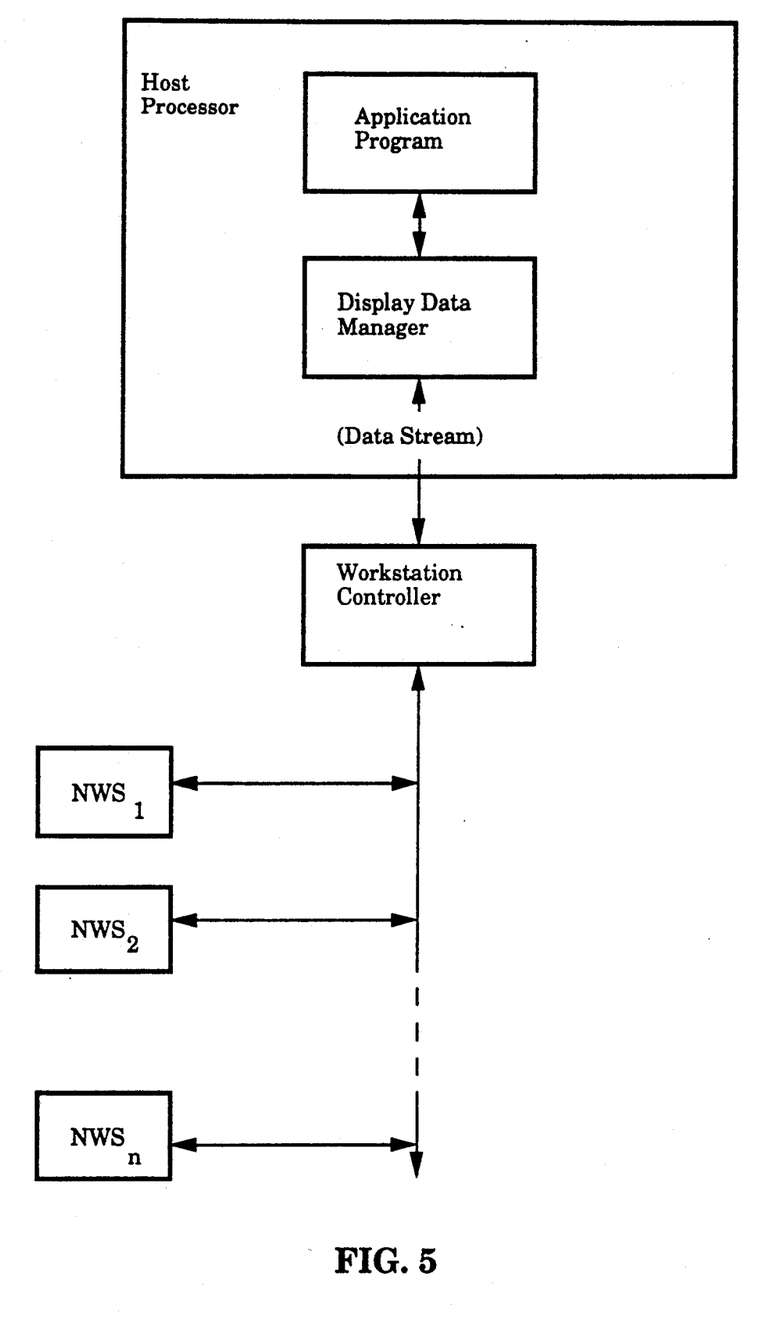
FIG. 5 shows a simplified diagram illustrating display data flow in a system having NWS terminals.

FIG. 5 shows a simplified diagram to illustrate the display data flow in a system having NWS terminals. The host processor executes application programs as a part of its normal operating function. These application programs communicate, from time to time, with the remote terminals connected in the system, either by processing keyboard data sent from the terminals or by generating display panel information to be transmitted to the terminals for display. When an applications program needs to communicate with a remote terminal it calls up an applications program interface routine, one form of which is identified as a "display data manager." When information is to be displayed at a remote terminal, the display data manager constructs a data stream according to a particular format, and transmits this data stream to a workstation controller. The workstation controller selectively interacts with all of the NWS devices, selectively activating the appropriate device and then passing the information to be displayed onto the selected NWS device.

An enhancement to predefined panel areas is the concept of "windows" which permits an application to present an overlay panel area which may include selection fields. Since the "windows" are typically relatively small areas of display, they present further and unique problems concerning the display and positioning of selection fields. Windows may be used in conjunction with action bars, wherein the selection of one of the actions described in the action bar results in a pull-down window appearing beneath the selected choice. The pull-down window itself displays a number of selection fields, and the selection of any of these fields results in further display image changes. Therefore, user interaction with application programs operating in the host processor is accomplished with an object-action method of user interaction with the keyboard/display at the remote terminal. This method is essentially a two-step process, wherein the user first selects an object to work with from a list of objects presented in the panel body displayed on the screen. Next, the user selects an action to perform from a list of actions presented in an action bar occupying the top row of the panel. Selecting an action results in the presentation of an associated pull-down menu, in which the user is requested to select options or parameters associated with that action.

The specific programming requirements for communicating between a workstation control interface and a typical host computer processor, are described in IBM Publication No. SA21-9247-6, entitled "IBM 5250 Information Display System—Functional Reference Manual." This information is incorporated by reference herein, as a disclosure of the required programming formats and data interchange. However in addition to the disclosure therein, the present invention requires implementation of additional processes which may be incorporated into the software of the workstation controller. In particular, the present invention is useful in processing action bar and pull-down menus in NWS terminals in a manner heretofore available only in PWS terminals, and improving the aesthetics in terms of user interaction with action bars in NWS terminals.

Figure 6:
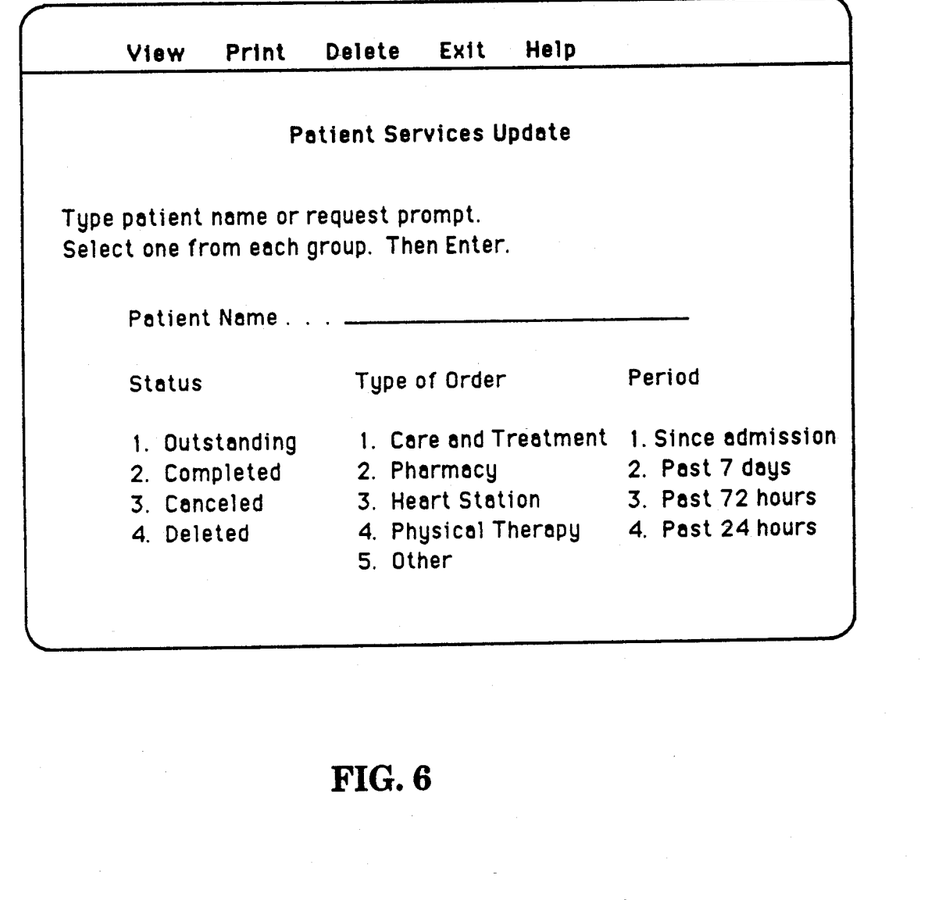
FIG. 6 shows an example panel illustrating action bar presentation choices according to the invention.

FIG. 6 shows a typical screen display, to illustrate a representative action bar presentation. The action bar portion of the panel of FIG. 6 appears across the top of the screen, and includes the respective actions "View," "Print," "Delete," "Exit," and "Help." Under conventional operating procedures a user may enter the name of a patient in the "Patient Name" entry field, and may then select one or more of the choices identified in the "Status," "Type of order," and "Period" selection fields. Once a selection field choice is made, the user may then select one of the actions identified in the action bar to cause the further display of a pull-down window, which window will present additional and further choices and/or parameters relating to the selected choice.

Figure 7:
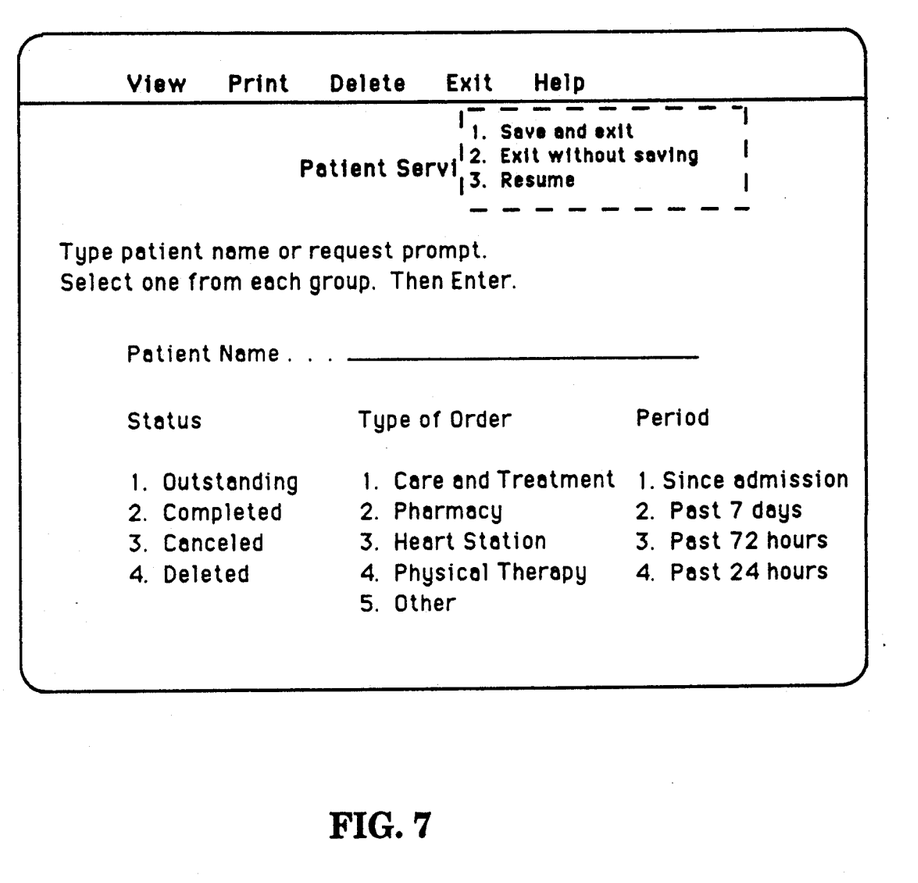
FIG. 7 shows an example panel illustrating an action bar pull-down menu according to the invention.

FIG. 7 illustrates a typical pull-down menu resulting from the selection of the "Exit" action bar choice. In this example, the user is presented with three options for making an exit from the display panel. Under the first option the data associated with the selection field choices made in the lower panel would be saved, and an exit would be made from the "Patient Services Update" panel. Under the second choice, an exit would be made from the "Patient Services Update" panel without saving any data. Under the third option, actions would resume under the "Patient Services Update" panel without actually making an exit.

The interactions described above, with reference to FIGS. 6 and 7, are accomplished in decidedly different ways in the prior art, depending upon whether the user interacts with a PWS application or with a host-based NWS application. Under the prior art PWS action bar model, the PWS user moves to the action bar via the "Switch-to-Action Bar" function key, which causes the selection cursor to be positioned on the first action choice. This function is performed instantaneously by the PWS. The PWS allows the user to select an action via a mnemonic character or an "Enter" keystroke, which selects the appropriate action. All of these selection techniques are processed locally by the PWS and the associated pull-down window is presented instantaneously. Once a pull-down window is generated, the user can browse other pull-down windows to the left or right by pressing the "Cursor left" or "Cursor right" key. The adjacent pull-down windows are instantaneously presented in response to these cursor movement keys. The action bar row on a PWS is typically presented in a different background color from the rest of the panel, since it is a separate panel area. A selection cursor, comprising a reverse image bar that covers the current choice, is positioned on the first action choice when the action bar is entered via the "Switch-to-Action Bar" key. Any pull-down window can be canceled by pressing the F12 function key, which causes instantaneous removal of the pull-down window by the PWS.

By contrast, an action bar on a prior art NWS terminal contains an entry field that precedes the action choices. Most NWS devices do not have the capability to present the action bar in a different background color from the rest of the panel. The NWS user moves to the action bar via the cursor movement keys; i.e., "Field advance," "Cursor up." When the user depresses the "Switch-to-Action Bar" function key, it causes a host processor interrupt, and the host application software positions the text cursor in the action bar entry field. An NWS terminal allows the user to select an action via a mnemonic character in a preceding entry field, coupled with the "Enter" key, or by moving the text cursor onto the desired action, coupled with an "Enter" keystroke, which selects the action where the text cursor is positioned. All of the foregoing selection steps are processed by the host application software, and the associated pull-down window is then presented by the host application software program.

The prior art NWS processing techniques have a number of deficiencies. Once such deficiency is that a host processor interrupt is required to process an action choice selection. This means that the generation of the associated pull-down window will not occur instantaneously, but will take about 1-2 seconds. An increased number of host processor interrupts, generated by a plurality of users of NWS terminals connected to the same host processor, further increases host processor utilization and decreases the overall system capacity. A second deficiency in the prior art NWS processing is that the NWS "Switch-to-Action Bar" keystroke causes a host processor interrupt. This mechanism for moving the cursor to the action bar is slow, and also increases the processing load on the host processor. A further deficiency in the NWS approach is that the F12 function keystroke, to cancel a pull-down window, causes a host processor interrupt, thereby increasing the processing load on the host processor. A further deficiency of the prior art NWS processing technique is that several keystrokes are required for cursor selection of action choices. The user must use the "Arrow" keys and move the text cursor one position at a time until it is positioned on the desired choice. A further deficiency is that there is no pull-down window "browse" function on an NWS terminal. Finally, the NWS terminal must display an action bar/entry field combination which requires additional screen space and is less aesthetic than the prior art PWS technique. Therefore, it is apparent that the prior art NWS terminal operation in connection with action bar and pull-down windows is inconsistent with the prior art PWS selection methods. The present invention removes this inconsistency and permits both types of applications to create the same apparent user interaction. In general, this is accomplished by incorporating into the WSC the enhanced processing characteristics formerly available only in a PWS, and by utilizing the WSC time-sharing abilities with a plurality of NWS terminals, to effectively provide each of the NWS terminals with this enhanced processing capability.

Figure 8A:
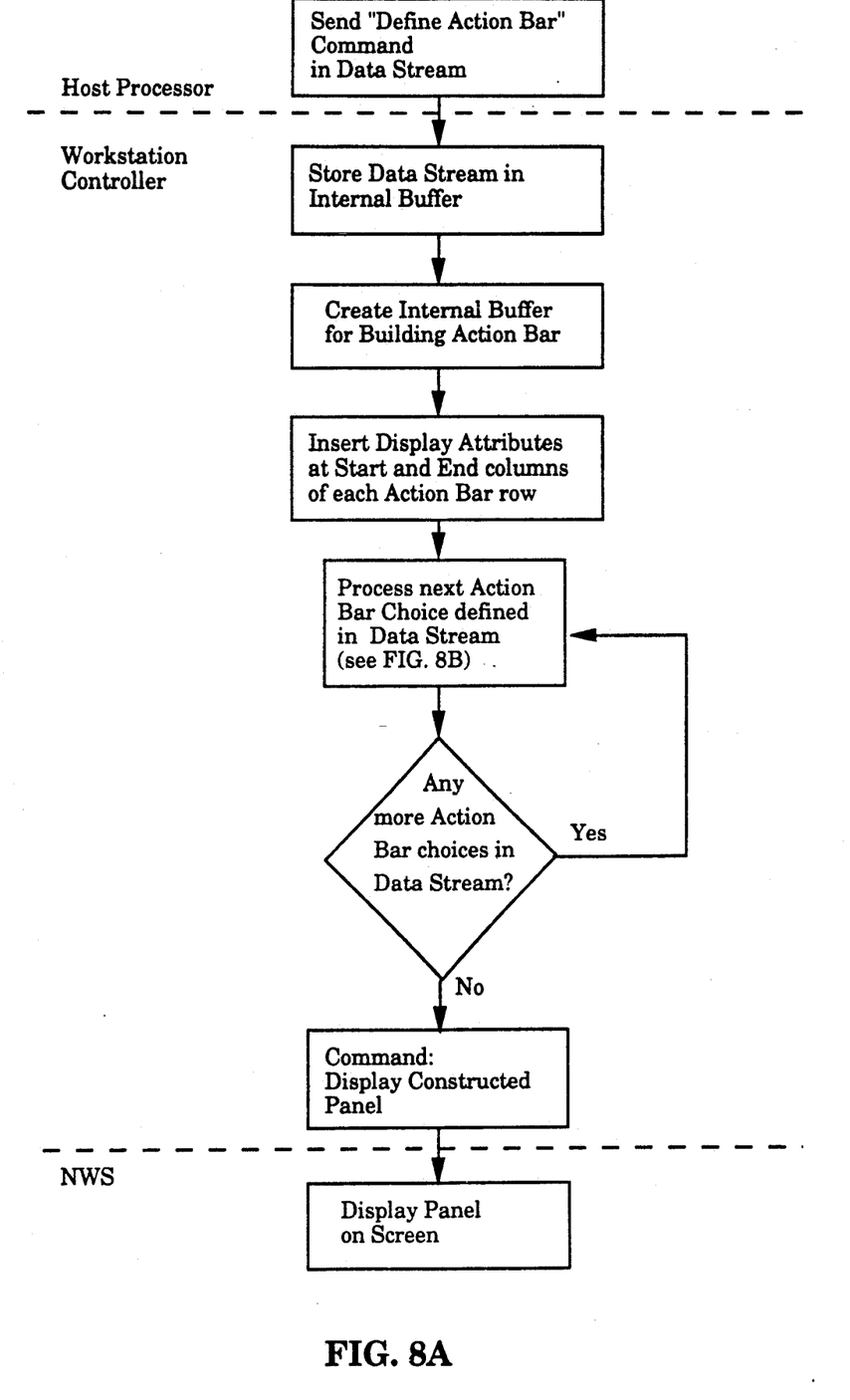
FIGS. 8A and 8B show the steps of WSC processing of a "Define Action Bar" command from the host processor.
Figure 8B:
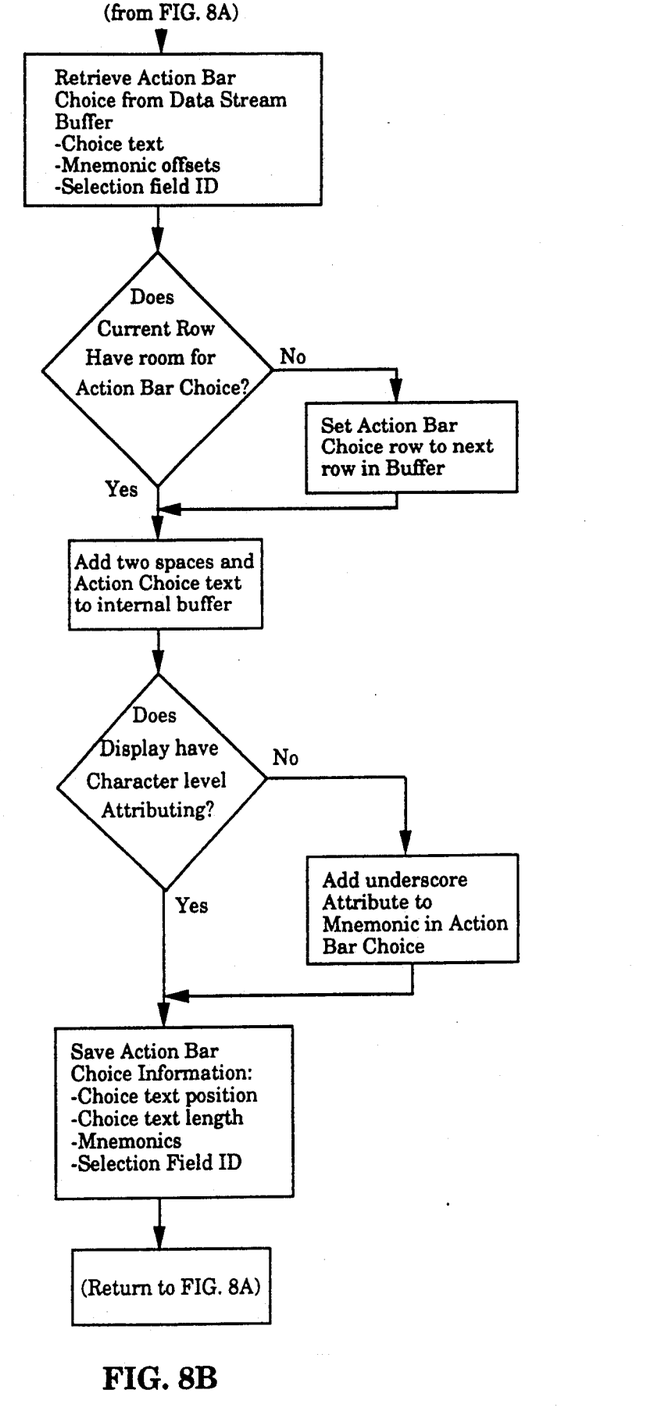

FIGS. 8A and 8B illustrate the processing steps which enable the WSC to receive a data stream from the host processor, to derive the action bar and pull-down window data from the data stream, and to transmit a display panel to the workstation for display on the workstation screen. The host processor, in particular the application program operating within the host processor, sends a "Define Action Bar" command to the workstation controller, together with an associated data stream. This command and data stream comprises a structured field which contains a major structure having flags defining the action bar functions, and a set of minor structures which describe the action choices that are to be presented to the user. The action bar major structure is transmitted in ten or more bytes, which contain the following action bar information:
1) The overall length of the structured field;
2) The class of the structured field, i.e., the same class as "text assist" structured fields;
3) The type of structured fields, i.e., a "Define Action Bar" field;
4) The window identifier which specifies the window that the action bar is associated with;
5) Flags to determine whether mnemonic selection of the action choices in the action bar will be enabled;
6) The panel row in which the action bar will start within the specified window;
7) The number of rows that will be used for the display of the action bar;
8) The action bar minor structures, which describe the action choices that are to be presented to the operator. The action bar minor structure may itself be contained within nine or more bytes, including the following information:
a) The length of the minor structure;
b) Certain flags which indicate whether the panel may be entered when a pull-down window selection is made, and flags which describe how mnemonic descriptors are to be used to associate a mnemonic with the action choice being defined;
c) A field identification list, which associates the action choice with the selection field within the pull-down window;
d) A mnemonic parameter which is used only when a mnemonic selection is enabled; and
e) An action choice text which describes the action that will take place if the choice is selected.

The foregoing information is embedded in the data stream transmitted from the host processor to the workstation controller, where the data stream is stored in an internal buffer. The workstation controller then initiates the processing operations to extract the data stream information from its transmitted form, and place it into a form suitable for constructing an action bar display panel. For example, the workstation controller utilizes the information identifying the starting and ending points of the action bar, and inserts display attributes at the start and end columns of each action bar row. The workstation controller then retrieves information relating to the first action bar choice defined in the data stream, and constructs a display buffer to reflect the choice text, mnemonic offsets and selection field identities. Every selection field that is defined for use in a pull-down window will have a unique identification; the WSC saves all information concerning these selection fields in its internal buffer when the selection fields are defined. This data is later used to construct the presentation of pull-down windows and their associated selection fields.

The action bar data is stored in internal WSC buffer memory in a more or less tabular form in order to facilitate later retrieval of the selection field contents. For example, Table 1 shows a representative form of storage for this action bar data:

TABLE 1

| Action Bar Choice | Action Choice Text Position (Row, Column) | Choice Text Length | Mnemonic | Associated Selection Field I.D. |
|---|---|---|---|---|
| 1 | (1, 4) | 6 | V | 01 |
| 2 | (1, 12) | 5 | P | 02 |
| . | . | . | . | . |
| . | . | . | . | . |
| n | (1, 8) | 4 | X | On |

For each of the foregoing selection field I.D.'s, the WSC internal buffer also retains a correlated list of selection field parameters associated with the selection field I.D. All of this information is derived from the data stream received from the host processor.

The WSC proceeds through a series of steps for processing each action bar choice, as illustrated in FIG. 8B. These steps enable the WSC to create a display panel, and to properly format the panel according to conventional programming techniques, to develop the necessary presentation for the action bar choices to be presented. After all of the action choices have been processed according to the steps illustrated in FIG. 8B, the WSC transfers the constructed display panel to the NWS, where it is displayed on the screen.

Figure 9:
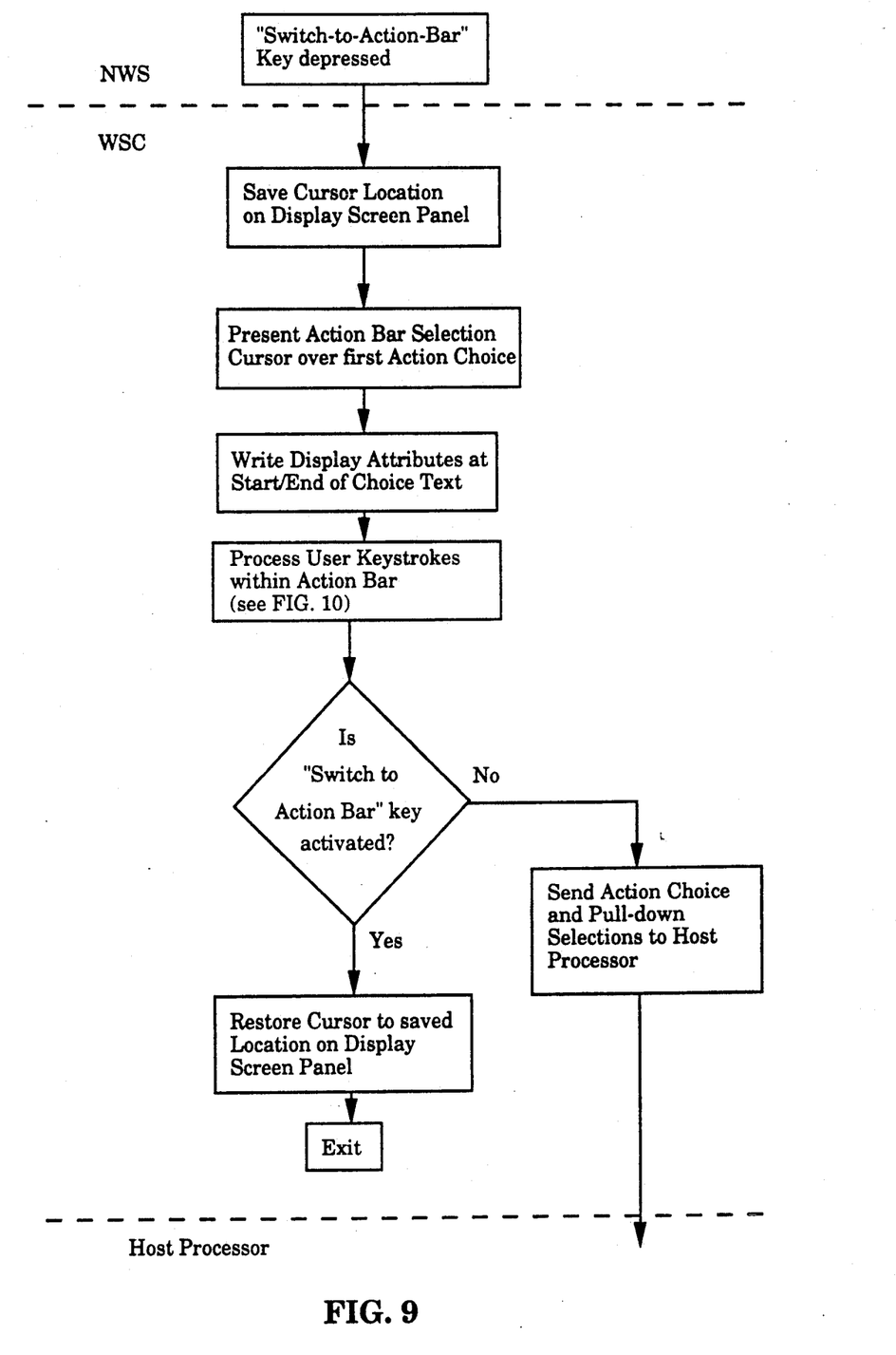
FIG. 9 shows a flow chart illustrating the steps of WSC processing of user interaction with an action bar.
Figure 10:
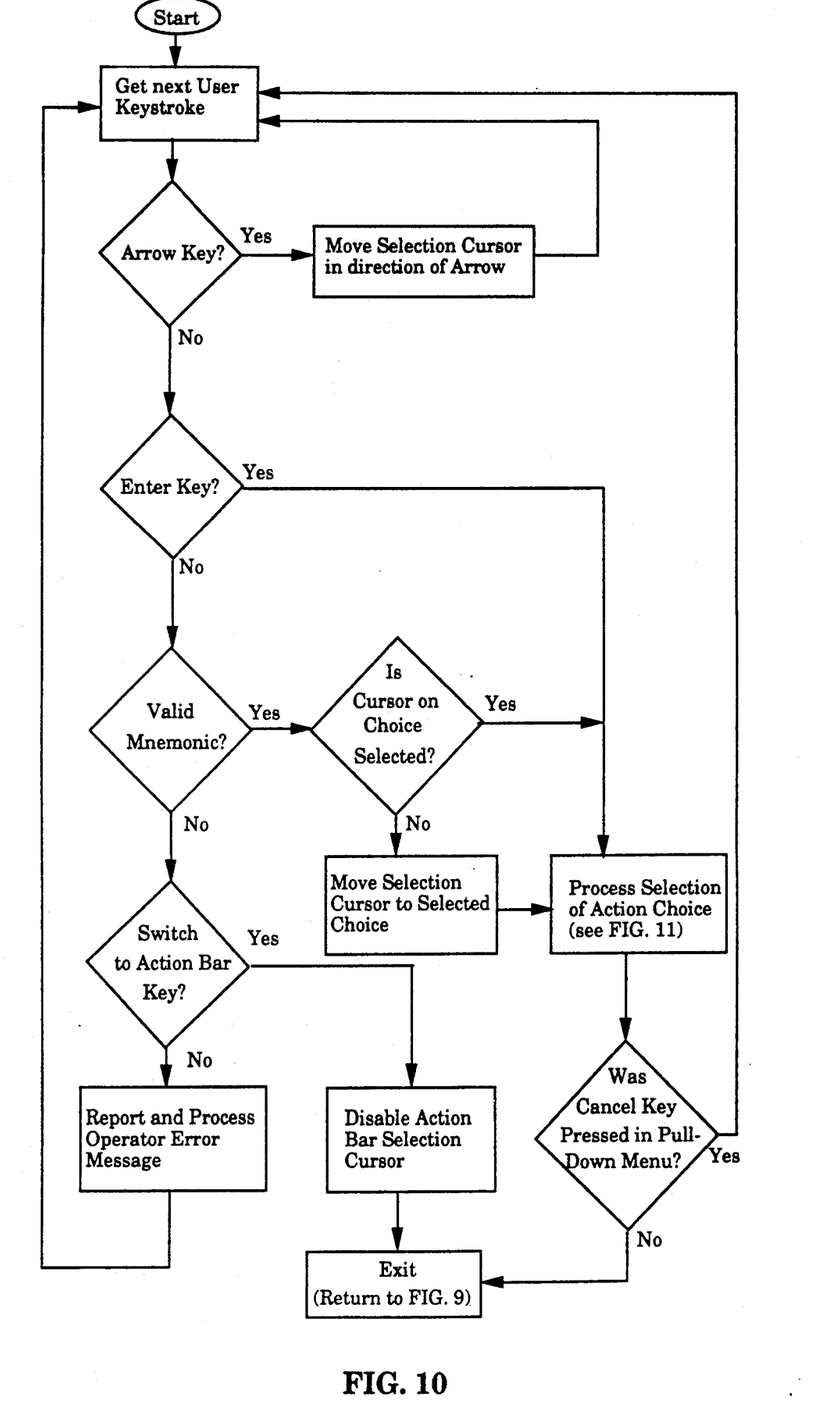
FIG. 10 shows a flow chart illustrating the steps of WSC processing of user keystrokes.

The WSC also assists in the processing of keystrokes received from the workstation which relate to the action bar and choices. For example, FIG. 9 illustrates the processing steps which occur when the user depresses the "Switch-To-Action Bar" key. The WSC initially saves the location where the cursor was positioned on the display screen panel at the time the key was depressed. The WSC then presents an action bar selection cursor over the first action choice, and writes display attributes at the start and end of the choice text. The WSC then waits for further user keystrokes within the action bar in order to accomplish the necessary processing required by the keystrokes. Examples of this processing are shown in FIG. 10, wherein the WSC goes through a series of interrogations to determine which key has been depressed, and to initiate processing steps required by the particular key selection. For example, if the "Arrow" key is depressed, the WSC moves the selection cursor in the direction indicated by the "Arrow" key. If the "Enter" key is depressed, the WSC initiates a series of processing steps illustrated in FIG. 11. If a valid mnemonic key is depressed, the WSC first determines that the selection cursor was on the choice selected and, if not, moves the selection cursor to the selected choice; the WSC then initiates the processing steps illustrated in FIG. 11. If the key depressed was a "Switch-To-Action Bar" key, the WSC disables the action bar selection cursor and returns to the processing steps shown in FIG. 9. These steps cause the WSC to restore the original cursor to the location previously saved, and to depart from further action bar processing.

Figure 11:
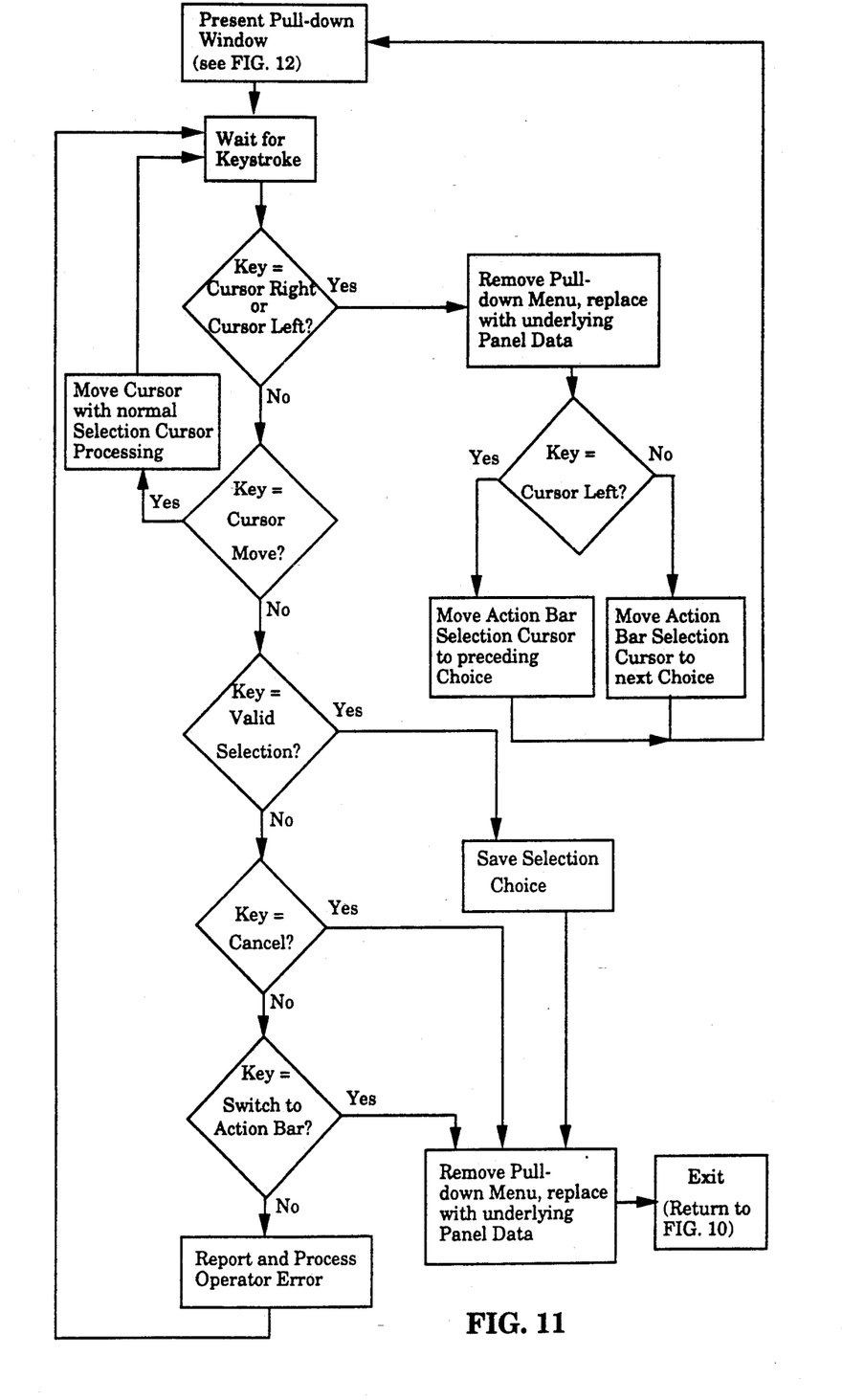
FIG. 11 shows a flow chart illustrating the steps of WSC processing of an action choice selection.
Figure 12:
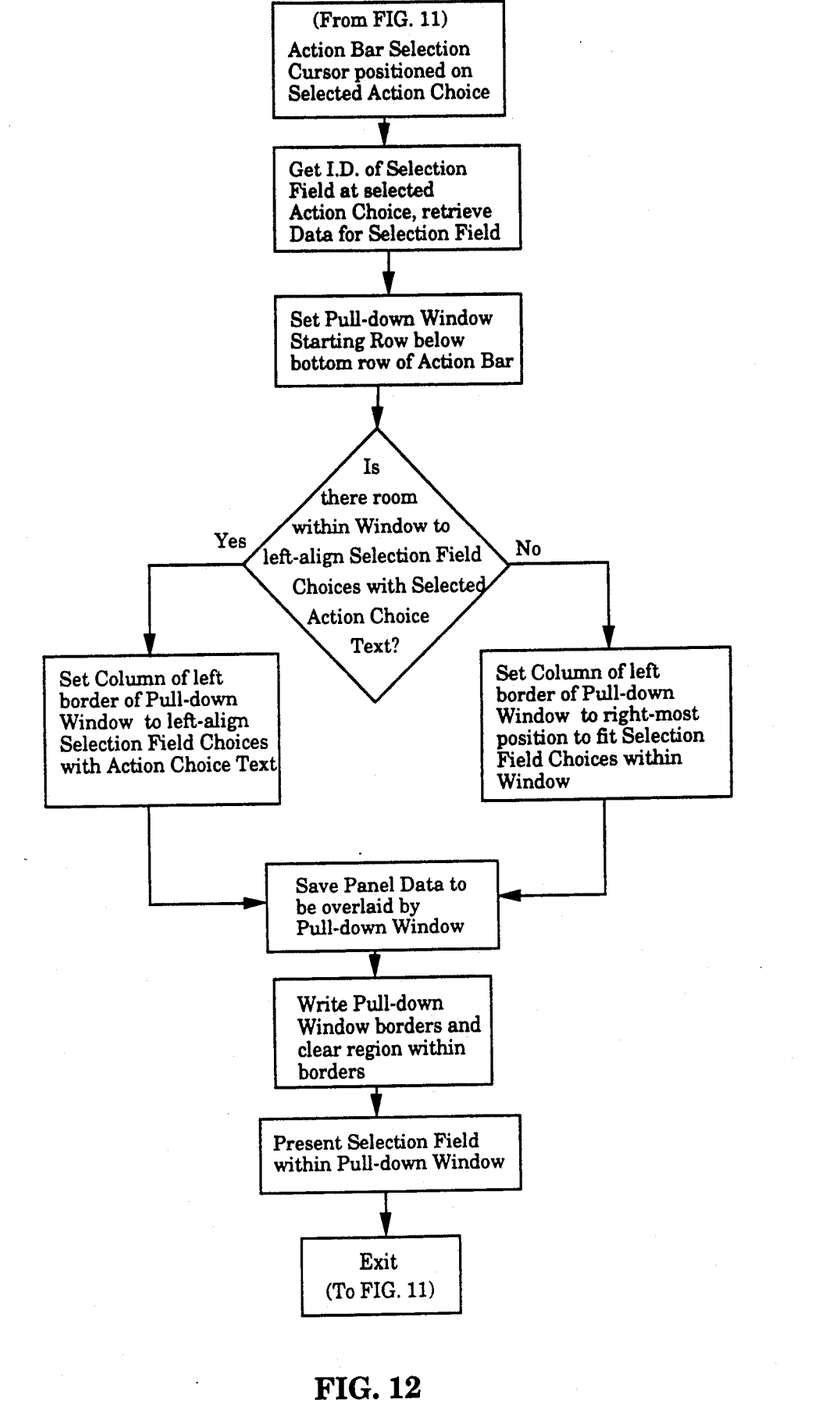
FIG. 12 shows a flow chart illustrating the steps of WSC processing of a pull-down presentation.

The processing steps illustrated in FIG. 11 relate to the presentation of the pull-down windows associated with the action bars and keystrokes. FIG. 12 shows the processing steps for presenting the pull-down windows, and after the processing steps shown by FIG. 12 are completed, the processing steps returned to FIG. 11 as indicated. The combinations of execution steps which might be performed in processing any particular keystroke are numerous, as illustrated by the numerous branches in FIGS. 10–12. However, after all combinations of processing steps are executed the operation always returns to the steps illustrated in FIG. 9, particularly to the decision box labeled "Is Switch-to-Action Bar Key Activated?" If this key has not been activated, the WSC sends the action choice information and the pull-down selections to the host processor for further processing by the host applications program. Once the "Switch-To-Action Bar" key has been activated, after processing has been completed with respect to the action bars, the WSC restores the cursor to its original location in a display panel and discontinues any further processing operations relating to action bars.

The foregoing description illustrates the considerable processing load which is placed into the WSC as a result of the present invention. It must be remembered that the processing steps described herein are performed within the WSC for all of the NWS terminals to which the WSC is connected. The WSC reserves certain internal buffer storage areas for retaining the action bar and choice information relating to each of the designated NWS terminals to which it is connected, and whenever an action bar processing activity is commanded for any one of these NWS terminals, the WSC performs the processing activities summarized herein. In this manner, the WSC performs the relatively highly sophisticated processing operation heretofore only available in PWS-based applications. The WSC accomplishes this processing on a more or less time-sharing basis with respect to all of the NWS terminals to which it is connected, without any of the NWS terminals requiring design modification or change. From the perspective of any particular NWS terminal, the information it receives and transmits to the WSC is no different than in the prior art. The NWS terminal is not cognizant of the fact that the processing operations required for its action bar processing is accomplished in the WSC, rather than in the host processor as was previously the case. The user at any particular NWS terminal interacts with the terminal with the same degree of speed and efficiency as the user would be accustomed to with respect to a PWS application, and therefore the invention enables an overall upgrade in the performance and efficiency of all NWS terminals in the system.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. In a computing system comprising a host processor, a workstation controller connected to the host processor, and a plurality of non-programmable workstations connected to the workstation controller, the improvement in presenting and processing action bars and pull-down menus at the workstation comprising:
    a) means for transmitting a data stream from said host processor to said workstation controller, the data stream including information describing at least one action bar and a plurality of possible pull-down menu displays for a designated workstation;
    b) means in said workstation controller for constructing a display panel to display an action bar from said action bar information, and means for transmitting said display panel construct to a designated one of said workstations;
    c) means for displaying said action bar at said designated workstation, and means for transmitting an action bar keystroke signal from said designated workstation to said workstation controller, said action bar keystroke signal being representative of an action choice in said action bar display panel;
    d) means in said workstation controller for constructing a pull-down menu display panel from said plurality of possible pull-down menu display panel to said designated workstation in response to said action bar keystroke signal; and
    e) means for displaying said pull-down menu display panel at said designated workstation.

2. The apparatus of claim 1, wherein said means for constructing a pull-down menu display panel further comprises means for saving the display panel displayed at said workstation, and means for constructing a pull-down menu display panel as an overlay over the display panel displayed at said workstation.

3. The apparatus of claim 1, wherein said means for constructing a display panel to display an action bar further comprises means for displaying an action bar selection cursor on said action bar.

4. The apparatus of claim 1, further comprising in said workstation controller, means for receiving keystroke signals from said designated workstation and further means for decoding said keystroke signals and modifying said constructed display panel in response to said decoded keystroke signals, and means for transmitting the modified display panel constructs to said designated workstation.

5. A method for presenting and processing action bars and pull-down menus at a plurality of workstations from a single workstation control interface connected to a host processor and said plurality of workstations, comprising the steps of:

a) formulating, in said workstation control interface, a display panel construct for each of said plurality of workstations, said display panel construct including information for displaying an action bar at each of said plurality of workstations;

b) transmitting, from said workstation control interface, the display panel constructs for displaying an action bar to each of said plurality of workstations;

c) displaying said action bar at each of said workstations, and transmitting keystroke signals from said workstations to said workstation control interface;

d) decoding said keystroke signals in said workstation control interface to identify the transmitting workstation and to identify predetermined keystroke signals associated with pull-down menus;

e) formulating, in said workstation control interface, in response to predetermined keystroke signals, pull-down menu display panel constructs, said constructs including information for displaying a pull-down menu at an identified workstation, and transmitting said pull-down menu display panel construct to said identified workstation; and f) displaying said pull-down menu display panels at said identified workstation.

* * * * *